No. 822,039. PATENTED MAY 29, 1906.
H. BESSER.
MOLDING DEVICE.
APPLICATION FILED DEC. 13, 1905.
2 SHEETS—SHEET 1.
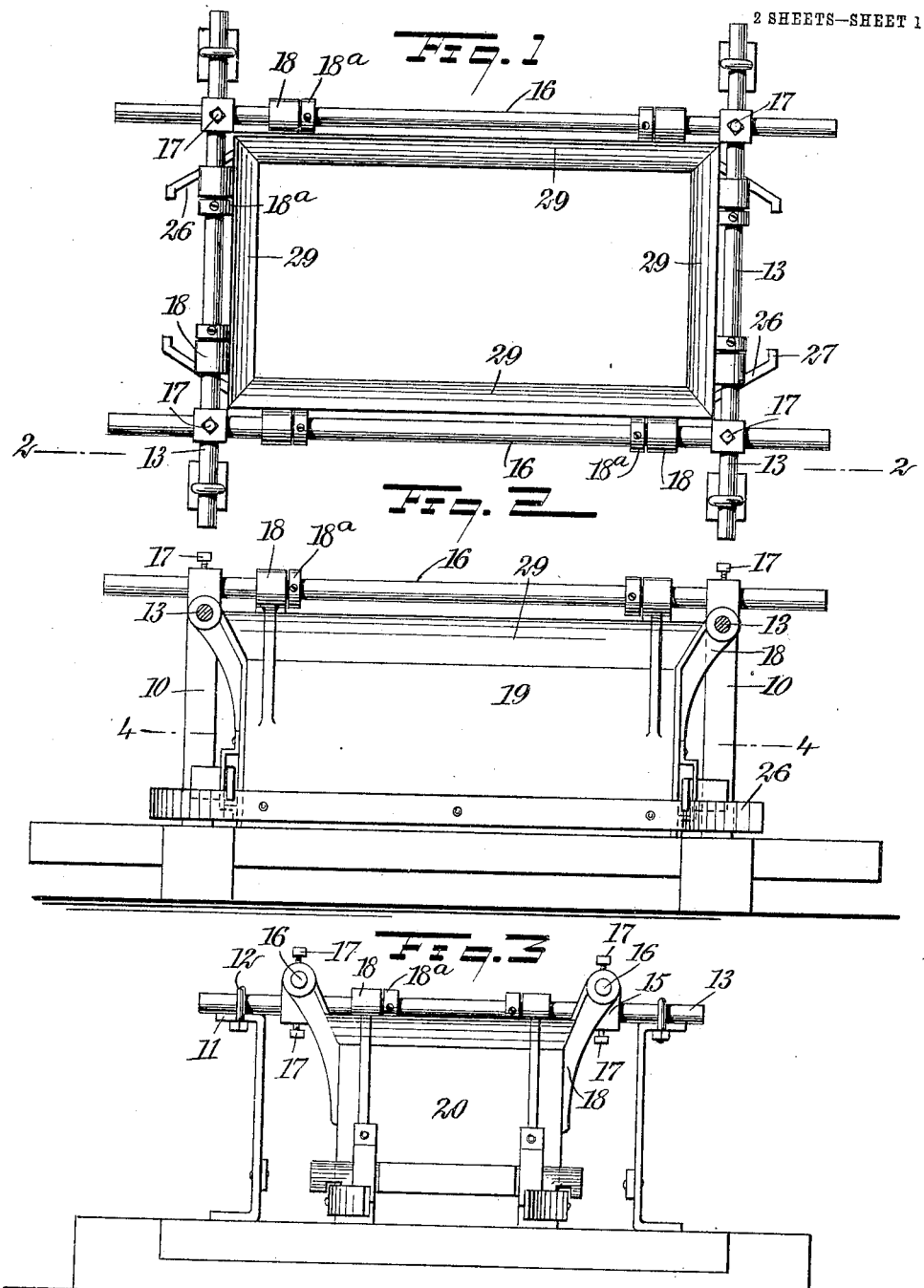
WITNESSES:
John a Bergstrom
C. E. Fay
INVENTOR
Herman Besser
BY
ATTORNEYS No. 822,039. PATENTED MAY 29, 1906.
H. BESSER.
MOLDING DEVICE.
APPLICATION FILED DEC. 13, 1905.
2 SHEETS—SHEET 2.
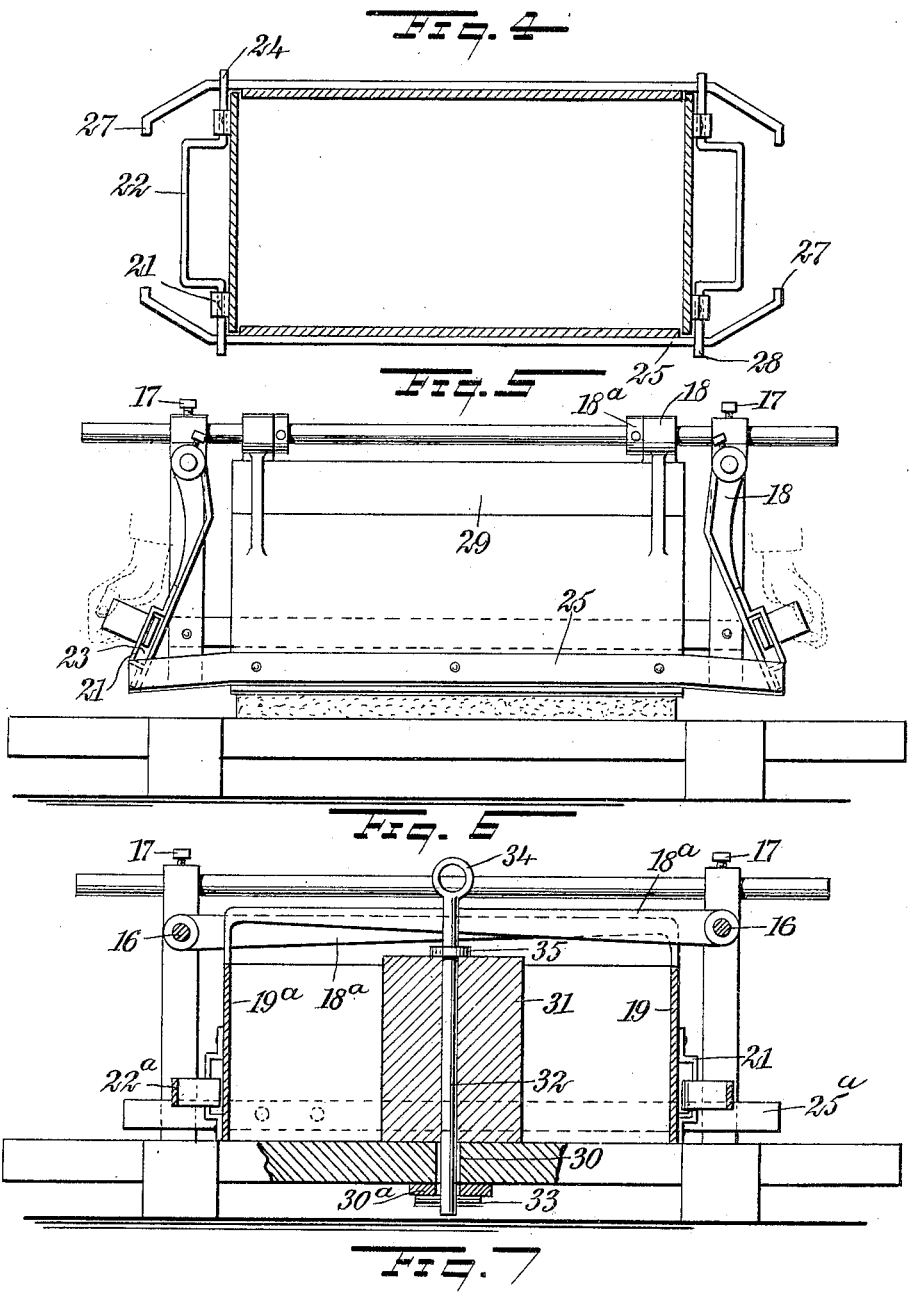
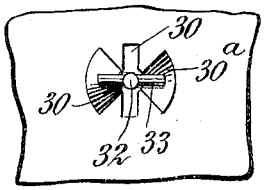
WITNESSES:
Joshua Bergstrom
C. E. Fay,
INVENTOR
Herman Besser
BY
Munn
ATTORNEYS

UNITED STATES PATENT OFFICE.

HERMAN BESSER, OF ALPENA, MICHIGAN.

MOLDING DEVICE.

No. 822,039. Specification of Letters Patent. Patented May 29, 1906.

Application filed December 13, 1905. Serial No. 291,560.

*To all whom it may concern:*

Be it known that I, HERMAN BESSER, a citizen of the United States, and a resident of Alpena, in the county of Alpena and State of Michigan, have invented a new and Improved Molding Device, of which the following is a full, clear, and exact description.

My invention relates to a device for carrying out what is ordinarily known as the "hand" method of molding building-blocks and other articles from plastic material. By this method the mold, which constitutes most of the device, is manipulated by hand to form a molded article; and the principal objects of the present invention are to provide means whereby manipulation of the handles used for lifting the mold will result in automatically and simultaneously withdrawing all the mold-walls from the surfaces of the molded article before the lifting operation is commenced, whereby these two operations are made practically continuous one with the other.

The invention also comprises means for transmitting motion from one mold-wall to another, which is really a part of the feature mentioned above, means for limiting the motion of the mold-walls outwardly and holding them in such position that the mold can be lifted without danger of the walls swinging inwardly against the plastic article, means for positively guiding the mold-walls both inwardly and outwardly and locking them when the mold is placed in position for molding on a pallet or the like, so that another mold will be in position for receiving the plastic material, means for supporting a hopper to guide the material into the mold, means for conveniently setting cores, and means for accomplishing the same results whether an ordinary four-part mold is employed or a mold of any other number of parts—as, for example, one comprising two parts, in which the end walls and partitions extend inwardly toward the center of the mold.

Further features of the invention will appear below.

Reference is to be had to the accompanying drawings, forming a part of this specification, in which similar characters of reference indicate corresponding parts in all the views.

Figure 1 is a plan of a molding device, showing the principle of my invention. Fig. 2 is a sectional view of the same on the line 2 2 of Fig. 1, the mold appearing mainly in elevation. Fig. 3 is an end elevation of the same. Fig. 4 is a sectional view on the line 4 4 of Fig. 2. Fig. 5 is a view similar to Fig. 2, showing the mold open and ready for lifting. Fig. 6 is a side elevation, partly in section, showing how the invention is applied to a different form of mold and also showing the provision for supporting a core; and Fig. 7 is a bottom plan view of the portion of the device shown in Fig. 6.

For convenience I have illustrated the invention as applied to a four-wall mold, and I shall refer to two of the walls as "sides" and two as "ends," although it will be understood that the parts mounted on the sides could be placed on the ends or part of them on each without departing from the spirit of the invention.

I have shown a frame comprising uprights 10 at the corners of the mold, these uprights being provided with horizontal flanges 11, which are provided with eyebolts 12. Through these eyebolts pass hollow or solid rods 13 at the ends of the device. On these rods are mounted blocks 15, each block being provided with a perforation to receive the rod 13 and with another perforation for receiving a side rod 16. It will be obvious that the four rods 13 and 16 in the present form of mold constitute a rectangle, which can be adjusted in size by moving the rods with respect to the blocks 15. When the proper size is reached, the parts are secured in position by set-screws or the like 17. The parts so far described constitute the main portion of the frame for supporting a mold.

On the side and end rods are pivotally mounted hinge-pieces 18. These hinge-pieces are connected with sides 19 and ends 20 either by being cast integral therewith or by being adjustably mounted through the instrumentality of bolts and slots. In order to keep the sides and ends or doors from shifting along the rods and allowing the mold to get out of square, I provide set-collars 18$^a$, held against the hinge-pieces by set-screws. The walls 19 and 20 constitute the mold proper, and, as will be observed, they are swung on the rods 13 and 16, so that they can move outwardly from each other, so as to free the molded object from the mold.

In order to provide for moving the walls outwardly, on two of them are located cleats 21, through which pass the ends of handles 22. These handles are formed of bar-iron or similar material and are of less width than the width of a passage 23 behind each cleat 21. Consequently the handles can move up and down in these passages, and their projecting ends 24 constitute latches. On the other walls—in this instance the side walls—are located plates 25, in which are notches 26, with which the latches are adapted to engage for locking the side and end walls in vertical position. The plates 25 project inwardly at their ends, their projections 26 extending far enough to be engaged by the edges of the end walls when the latter are swung outwardly on their pivots, thus transmitting motion from the end walls to the side walls.

At the ends of the projections 26 are sharp bends 27, with which the lower edges of the end walls engage at the limit of their motion. These bends prevent the end walls from moving beyond them, and consequently limit the motion of all the walls. As the walls are then held in this position while an operator lifts upwardly on the handles 22, it will be obvious that the whole molding device can be raised without any danger of any disarrangement of the parts.

When it is desired to close the mold, the molding device is deposited upon a pallet and the handles 22 moved inwardly. The projections 24 are provided with downwardly-extending tongues 28, which engage the outer surfaces of the plates 25, thus forcing the side walls to move inwardly with the end walls and affording a positive connection for this purpose. When the walls are all vertical, the handles are moved downwardly and engage in the notches 26, so as to lock the parts in this position.

In order to provide for directing the molding material into the mold, I place plates 29 on the hinge-pieces 18, four of these plates being shown in the present form of the invention. It will be obvious that these plates being mounted on the hinge-pieces will move with them and that when the mold is closed a complete hopper is provided.

The parts described above are generic to the invention and can be used in the simplest form on molds having three or more walls; but for a two-part mold in which the two mold-walls swing from a center line it will be obvious that if they are pivoted in the manner shown in Fig. 2 their projecting end walls, which are integral with the side walls, and also any projecting partitions, such as are used for tile-molds and extend to the center line thereof, would upon swinging engage the pallet and stop all motion until the mold was lifted. As it is desired to remove the mold-walls from the molded article before the lifting operation commences, it is merely necessary to introduce a modification into the hinge-pieces 18. In Fig. 6 I have shown how I accomplish this result. Two walls 19$^a$, which meet at the center of the mold and constitute the entire outer portion of the mold, are provided with hinge-pieces 18$^a$, which extend across the mold and are mounted on the rods 16 in the same manner as the hinge-pieces 18 of the other figures are mounted upon them. In this form of mold handles 22$^a$ may be employed and plates 25$^a$, corresponding to the plates 25; but as there are no separate end walls these pieces are secured to one of the side walls and are engaged by the latch on the other.

On account of the fact that this style of mold is most ordinarily employed for making tiles and similar hollow articles of a simple nature I have taken occasion to illustrate in the figures showing it the manner in which I use ordinary cores on my molding device. The pallet is provided with a slot 30 and on the under surface with a pair of cams 30$^a$. A core 31, which it is intended to place above the slot, is provided with a rod 32, having a pin 33 on the end. This pin or key is adapted to pass through the slot 30, and then when the rod is turned by means of a handle 34 the pin will ride up the inclined surfaces 30$^a$ and lock the core in position. A collar 35 is provided on the rod for preventing longitudinal motion of the rod beyond a certain point.

The operation of the device will be readily understood. Supposing the mold to be placed on a pallet in locked position, the parts will be ready for the reception and tamping of the molding material. After the molding operation is completed in order to remove the mold from the molded article the operator grasps the handles 22 and first lifts them in the passages 23 to disengage them from the notches 26 and then moves them outwardly. This obviously swings the end walls outwardly. They come in contact with the projections 26 of the plates 25 and press the side walls apart until the end walls come in contact with the bends 27 at the extreme end of the side pieces. These bends hook into the lower edges of the end walls and hold them firmly, so that the whole device can be lifted from the finished product without disarranging the parts of the device. When the device is to be closed, the tongues on the latches engage the outer edges or surfaces of the projections 26 and force them inwardly, when the handles are forced inwardly after the device is again set down on another pallet for molding. When the walls are vertical, the latches are depressed and the parts are locked.

Having thus described my invention, I claim—

1. In a device of the class described, an expansible mold comprising a substantially rectangular frame, side and end walls hinged to the frame, means connected with the end walls for moving the same, and means connected with the side walls and engaging said moving means whereby to move the side walls in unison with the end walls.

2. In a device of the character described, an expansible mold comprising a substantially rectangular frame, side and end walls depending from the frame, handles movably connected with the end walls for swinging the same, and means connected with the side walls and engaging said handles whereby to move the side walls in unison with the end walls.

3. A molding device comprising movable mold-walls, a plate on one wall, and a movable latch on another wall for locking said plate, said plate having a bend for engaging the edge of the other wall and limiting the motion of both walls.

4. A molding device comprising movable mold-walls, a plate on one wall, and a movable latch on another wall for locking said plate, said plate having a bend for engaging the edge of the other wall and limiting the motion of both walls, said latch having a projection on the outside of said plate for engaging the latter and forcing it inwardly.

5. A molding device comprising movable mold-walls, a plate on one wall having inwardly-projecting ends beyond the ends of said wall, a movable latch on another wall adapted to engage said plate and lock the two adjacent walls together, the second wall being adapted to engage the projection on said plate for forcing the first wall outwardly, and means on the latch for engaging the outer edge of said plate.

6. A molding device comprising movable mold-walls, a plate on one wall having inwardly-projecting ends beyond the ends of said wall, a movable latch on another wall adapted to engage said plate and lock the two adjacent walls together, the second wall being adapted to engage the projection on said plate for forcing the first wall outwardly, means on the latch for engaging the outer edge of said plate, and means for swingingly mounting said walls, said means comprising hinge-pieces extending from each wall across the mold to the opposite side thereof, the outer ends of said hinge-pieces being pivotally mounted.

7. In a molding device, the combination of a frame comprising a plurality of adjustably-mounted rods, hinge-pieces pivotally mounted on each rod and extending across the device, mold-walls mounted on the hinge-pieces, means on the mold-walls for simultaneously and automatically swinging each wall outwardly when the device is lifted, and set-collars secured to the rods against the hinge-pieces.

8. In a molding device, the combination of a frame, bearings thereon, a pair of rods mounted in parallel position in said bearings, blocks mounted adjustably on said rods, a second pair of rods adjustably mounted on said blocks and located at an angle to the first-named rods, a series of hinge-pieces pivoted to each of said rods, mold-walls suspended from said hinge-pieces, handles connected with sundry of said mold-walls, and means whereby said handles may simultaneously swing all of said walls outwardly.

9. In a molding device, the combination of a frame having bearings, a pair of rods mounted thereon, a pair of blocks adjustably mounted on each rod, a second pair of rods adjustably supported by said blocks, hinge-pieces pivotally connected with each rod, inclined walls constituting a hopper mounted on said hinge-pieces, and mold-walls mounted on said hinge-pieces.

10. A molding device comprising movable side and end walls, handles in connection with said end walls, and means connecting the handles and the side walls whereby to move all of the walls in unison.

In testimony whereof I have signed my name to this specification in the presence of two subscribing witnesses.

HERMAN BESSER.

Witnesses:
S. A. DAWSON,
C. H. REYNOLDS.